US012519784B2

(12) United States Patent
Mishra et al.

(10) Patent No.: US 12,519,784 B2
(45) Date of Patent: Jan. 6, 2026

(54) PRIVATE NETWORKS SHARING SLICED RESOURCES WITH PUBLIC NETWORK

(71) Applicant: A5G Networks, Inc., Nashua, NH (US)

(72) Inventors: Rajesh Kumar Mishra, Westford, MA (US); Kaitki Agarwal, Westford, MA (US)

(73) Assignee: A5G Networks, Inc., Nashua, NH (US)

( * ) Notice: Subject to any disclaimer, the term of this patent is extended or adjusted under 35 U.S.C. 154(b) by 341 days.

(21) Appl. No.: 17/735,913

(22) Filed: May 3, 2022

(65) Prior Publication Data

US 2022/0360580 A1 Nov. 10, 2022

Related U.S. Application Data

(60) Provisional application No. 63/184,124, filed on May 4, 2021.

(51) Int. Cl.
*H04L 9/40* (2022.01)
*G06N 20/00* (2019.01)
*H04L 67/141* (2022.01)

(52) U.S. Cl.
CPC ......... *H04L 63/0876* (2013.01); *G06N 20/00* (2019.01); *H04L 63/102* (2013.01); *H04L 63/20* (2013.01); *H04L 67/141* (2013.01)

(58) Field of Classification Search
CPC ... H04L 63/0876; H04L 63/102; H04L 63/20; H04L 67/141; G06N 20/00
See application file for complete search history.

(56) References Cited

U.S. PATENT DOCUMENTS

| 7,356,001 | B1 * | 4/2008 | Jones | H04W 84/02 370/331 |
| 9,491,002 | B1 * | 11/2016 | Brandwine | H04L 45/02 |
| 10,785,652 | B1 * | 9/2020 | Ravindranath | H04W 12/48 |
| 11,405,967 | B2 * | 8/2022 | Zhang | H04L 41/40 |
| 2002/0075844 | A1 * | 6/2002 | Hagen | H04L 63/0442 370/328 |
| 2018/0026907 | A1 * | 1/2018 | Miller | G06F 12/1408 |
| 2021/0250890 | A1 | 8/2021 | Won | |
| 2021/0360714 | A1 | 11/2021 | Zhang et al. | |

FOREIGN PATENT DOCUMENTS

| CN | 112422300 A | * | 2/2021 |
| CN | 112423301 | | 2/2021 |
| WO | 2020254301 | | 12/2020 |
| WO | 2021204369 | | 10/2021 |

* cited by examiner

*Primary Examiner* — Jeffrey C Pwu
*Assistant Examiner* — Mayasa A. Shaawat
(74) *Attorney, Agent, or Firm* — Schwegman Lundberg & Woessner, P.A.

(57) ABSTRACT

The present disclosure describes solutions for seamless enterprise network integration with operator networks. Enterprise networks can include full network resources to provide a complete, isolated network. The enterprise network can also host mobile network operator users with edge managers acting as routing agents. Moreover, when an enterprise moves outside of the enterprise network, the enterprise user can still access the enterprise network via an operator network without compromising security, privacy, and reliability. A neutral hosted core can be used as a routing agent to the enterprise network from one or more operator networks.

14 Claims, 8 Drawing Sheets

US 12,519,784 B2

PRIVATE NETWORKS SHARING SLICED RESOURCES WITH PUBLIC NETWORK

CLAIM OF PRIORITY

This application claims the benefit of priority to U.S. Provisional Patent Application Ser. No. 63/184,124, filed on May 4, 2021, and entitled "Private networks sharing sliced resources with the public network," which is incorporated herein by reference in its entirety.

TECHNOLOGY FIELD

The disclosed subject matter is related generally to Software as a Service (SaaS), and more particularly, to a distributed, local, and multi-cloud core with machine learning based intelligence and edge compute for use in enterprise applications.

BACKGROUND

As cloud-based services and user consumption of data grows, operators are looking to save cost and provide scalable solutions that can also serve enterprises (also referred to as private networks). Conventional systems are primarily hosted locally or on a single cloud provider. These conventional systems do not allow seamless enterprise integration with operator networks (also referred to as public networks).

While some conventional systems can allocate network slices to offer services to enterprise networks, these conventional slice sharing methodologies suffer from serious drawbacks. For example, there are privacy, security, and reliability issues for enterprise systems because the operator network can gain access to sensitive data of the enterprise users when they use these non-secure shared slices.

Therefore, the inventors recognized a need for leveraging existing network resources and spectrum to be used for enterprise systems while maintaining isolation (e.g., privacy and reliability) and providing seamless coverage and capacity to operator networks for roaming.

SUMMARY

The present disclosure describes a method for facilitating roaming into a private network, the method comprising: establishing a connection between a radio access network component associated with the private network and a device registered with a public network; identifying, by the private network, the device as being associated with the public network; establishing a secure connection between a first edge manager in the private network and a second edge manager in public network; authenticating, by the public network, the device as being registered with the public network; and exchanging data traffic between the device and the public network using the secure connection.

The present disclosure also describes a system including at least one hardware processor; and at least one memory storing instructions that, when executed by the at least one hardware processor, cause the at least one hardware processor to perform actions comprising: establishing a connection between a radio access network component associated with the private network and a device registered with a public network; identifying, by the private network, the device as being associated with the public network; establishing a secure connection between a first edge manager in the private network and a second edge manager in public network; authenticating, by the public network, the device as being registered with the public network; and exchanging data traffic between the device and the public network using the secure connection.

The present disclosure further describes a machine-storage medium embodying instructions that, when executed by a machine, cause the machine to perform actions comprising: establishing a connection between a radio access network component associated with the private network and a device registered with a public network; identifying, by the private network, the device as being associated with the public network; establishing a secure connection between a first edge manager in the private network and a second edge manager in public network; authenticating, by the public network, the device as being registered with the public network; and exchanging data traffic between the device and the public network using the secure connection.

BRIEF DESCRIPTION OF FIGURES

Various ones of the appended drawings merely illustrate example implementations of the present disclosure and should not be considered as limiting its scope.

DETAILED DESCRIPTION

The present disclosure describes solutions for seamless enterprise network integration with operator networks. Enterprise networks (also referred to as private networks) can include full network resources to provide a complete, isolated network. The enterprise network can also host mobile network operator (MNO) users (also referred to as public users) with edge managers acting as routing agents. Moreover, when an enterprise user (also referred to as private user) moves outside of the enterprise network, the enterprise user can still access the enterprise network via an operator network without compromising security, privacy, and reliability. A neutral hosted core can be used as a routing agent to the enterprise network from one or more operator networks. Hence, the examples described herein can provide secure, seamless integration between operator and enterprise networks that can be General Data Protection Regulation (GPDR) compliant.

Figure 1:
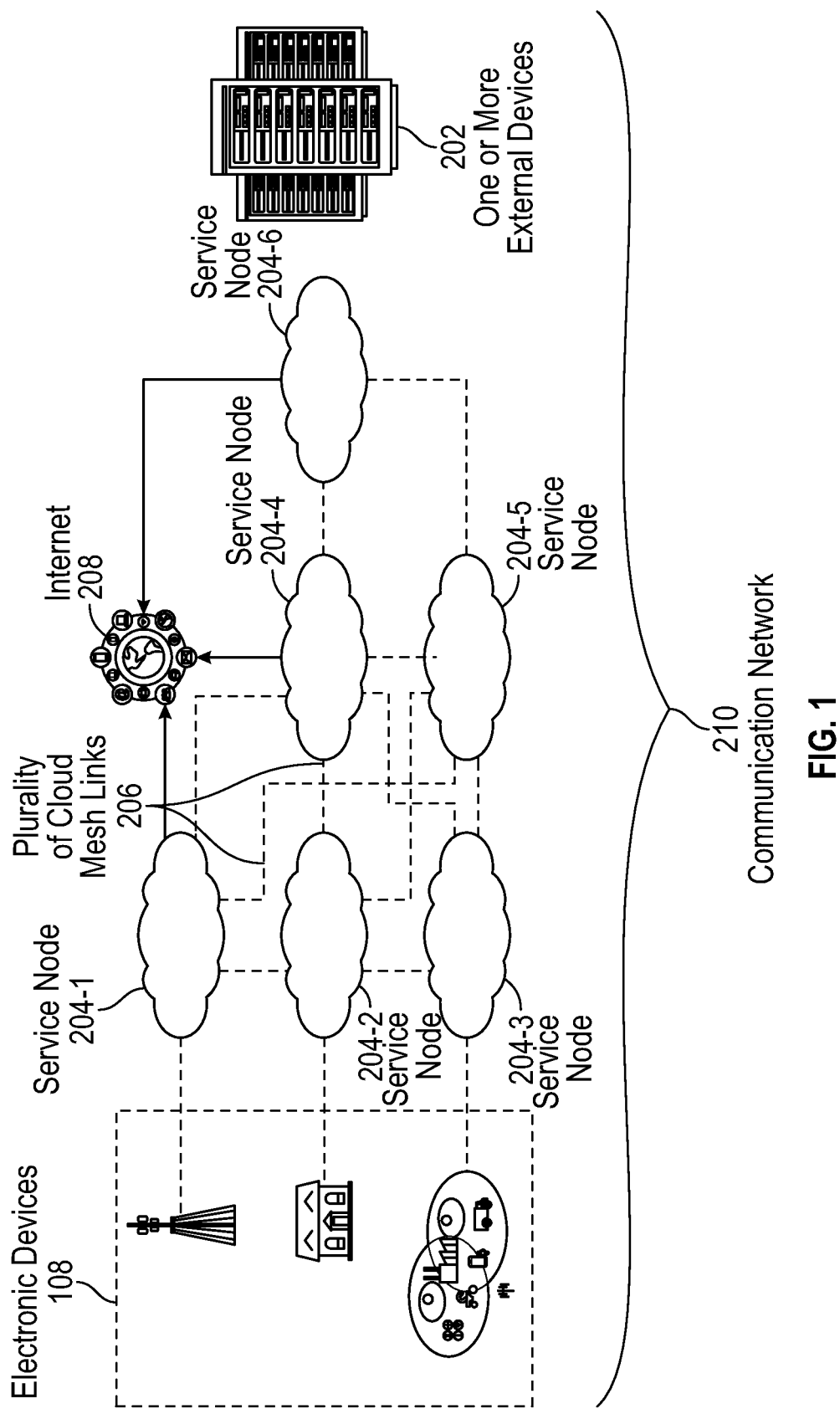
FIG. 1 is a schematic representation of an exemplary cloud system autonomous data and signaling traffic management in a distributed infrastructure, in accordance with some embodiments of the present disclosure.

FIG. 1 is a schematic representation of an exemplary cloud system autonomous data and signaling traffic management in a distributed infrastructure, in accordance with some embodiments of the present disclosure. The cloud infrastructure 200 includes one or more external devices 202 communicatively coupled to a plurality of service nodes 204-1, 204-2, 204-3, 204-4, 204-5 . . . 204-N via a transport network. For the sake of present description, the plurality of service nodes 204-1, 204-2, 204-3, 204-4, 204-5 . . . 204-N have been represented as the plurality of service nodes 204. In some embodiments of the present disclosure, the plurality of service nodes 204 may host a set of network functions including 4G, 5G or Wi-Fi network functions, such as Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Centralized Unit (CU), Access & Mobility Management Function (AMF), Session Management Function (SMF), User Plane Function (UPF), Non-3GPP Interworking Function (N3IWF), Network Data Analytics Function (NWDAF), Network Repository Functions (NRF), Network Slicing Selection Function (NSSF), Network Exposure Function (NEF), Unified Data Management (UDM), Authentication Server Function (AUSF), Point Coordination Function (PCF) and the like. In some embodiments, the one or more external devices 202 may include one or more local servers, one or more cloud servers, compute nodes, content data network, internet, the set of network functions, one or more proxy servers and the like. The one or more external devices 202 are configured to host one or more services accessible by the plurality of service nodes 204.

Further, each of the plurality of service nodes 204 may act as a computing system including a plurality of modules to handle various functionality, as described herein. In some embodiments of the present disclosure, the one or more data centers may correspond to private cloud, public cloud, hybrid cloud and the like. Furthermore, the plurality of service nodes 204 are connected with each other via a plurality of cloud mesh links 206. The plurality of cloud mesh links 206 are secured ad hoc routing connections, such as Open Shortest Path First (OSPF) and the like between the plurality of service nodes 204. In some embodiments of the present disclosure, the plurality of service nodes 204 may include multiple physical parameters characterizing the plurality of service nodes 204 and compute one or more system parameters, such as energy requirement, power utilization, processing type, processing power, configuration and the like. Further, each of the plurality of service nodes 204 may have their own state information and characteristics, such as delay, jitter, packet flow information, protocol parameter information, quality of experience and the like, known as one or more network function parameters. In some embodiments of the present disclosure, one or more external inputs or parameters are received by a computing system via internet 208. Furthermore, the one or more system parameters, the one or more network function parameters and the one or more external inputs or parameters are one or more computing system parameters.

In some embodiments of the present disclosure, the service node 204-1, the service node 204-2 and the service node 204-3 are far edge clouds at first level of hierarchy within the cloud infrastructure 200. The first level of hierarchy corresponds to a first proximal distance from the one or more electronic devices 108. Further, the service node 204-4 and the service node 204-5 are regional edge clouds at second level of hierarchy within the cloud infrastructure 200. In some embodiments of the present disclosure, the second level of hierarchy corresponds to a second proximal distance from the one or more electronic devices 108. In some embodiments of the present disclosure, the service node 204-6 is closer to the one or more external devices 202. The service node 204-6 is at third level of hierarchy within the cloud infrastructure 200. In some embodiments of the present disclosure, the third level of hierarchy corresponds to a third proximal distance from the one or more electronic devices 108. In some embodiments of the present disclosure, the one or more external devices 202 may be main data center. In some embodiments of the present disclosure, each of the plurality of service nodes 204 is connected to the internet 208, as shown in FIG. 1.

Further, the cloud infrastructure 200 includes one or more orchestrator nodes connected to the plurality of service nodes 204 via a set of cloud mesh links. In some embodiments of the present disclosure, each of the one or more orchestrator nodes is an instance of a collective group of network functions hosted on the one or more data centers.

Furthermore, the cloud infrastructure 200 includes one or more electronic devices 108 associated with an organization connected to a communication network 210 via a communication channel. In some embodiments of the present disclosure, the communication network 210 may be private network, public network, smart city network, connected car network, Fixed Wireless Access (FWA) and the like. In some embodiments of the present disclosure, the one or more electronic devices 108 are connected to the plurality of service nodes 204. The one or more electronic devices 108 may be used by one or more users associated with the organization to access the communication network 210 for accessing one or more services hosted on the internet 208. In some embodiments of the present disclosure, the one or more external devices 202 are located nearby to the organization. In some embodiments of the present disclosure, the one or more electronic devices 108 may include a laptop computer, desktop computer, tablet computer, smartphone, wearable device, smart watch and the like. In some embodiments of the present disclosure, the one or more electronic devices 108 may also include a microprocessor, a server and the like. Further, the one or more electronic devices 108 include a local browser, a mobile application or a combination thereof. The one or more users may use a web application via the local browser, the mobile application or a combination thereof to communicate with the computing system. In some embodiments of the present disclosure, the one or more electronic devices 108 may access the computing system via a radio access network.

In some embodiments of the present disclosure, the computing system receives a request from the one or more electronic devices 108 within the communication network 210 to access the one or more services hosted on the one or more external devices 202 or a set of services hosted on the internet 208. Further, the computing system determines one or more network parameters based on the received request, one or more device parameters and the one or more computing system parameters by using a trained traffic management based Machine Learning (ML) model. The computing system also determines current network demand within the cloud infrastructure 200 based on the received request by using the trained traffic management based ML model. The computing system determines one or more service nodes at multiple levels of hierarchy within the cloud infrastructure 200 from the plurality of service nodes 204 based on the determined one or more network parameters and the determined current network demand by using the trained traffic management based ML model. In an embodiment of the present disclosure, the one or more service nodes at first level of hierarchy within the cloud infrastructure 200 are service node 204-1, service node 204-2 and service node 204-3, service node 204-4, service node 204-5 and service node 204-6. Furthermore, the computing system dynamically establishes one or more cloud mesh links between the determined one or more service nodes 204-1, 204-2, 204-3, 204-4, 204-5 and 204-6 at the multiple levels of hierarchy and the one or more external devices 202 based on the determined one or more network parameters and the current network demand by using the trained traffic management based ML model. The multiple levels of hierarchy comprises first level, second level, third level of hierarchy and the like. The computing system processes the received request by providing access of the one or more services hosted on the one or more external devices 202 to the one or more electronic devices 108 via the established one or more cloud mesh links.

Figure 2:
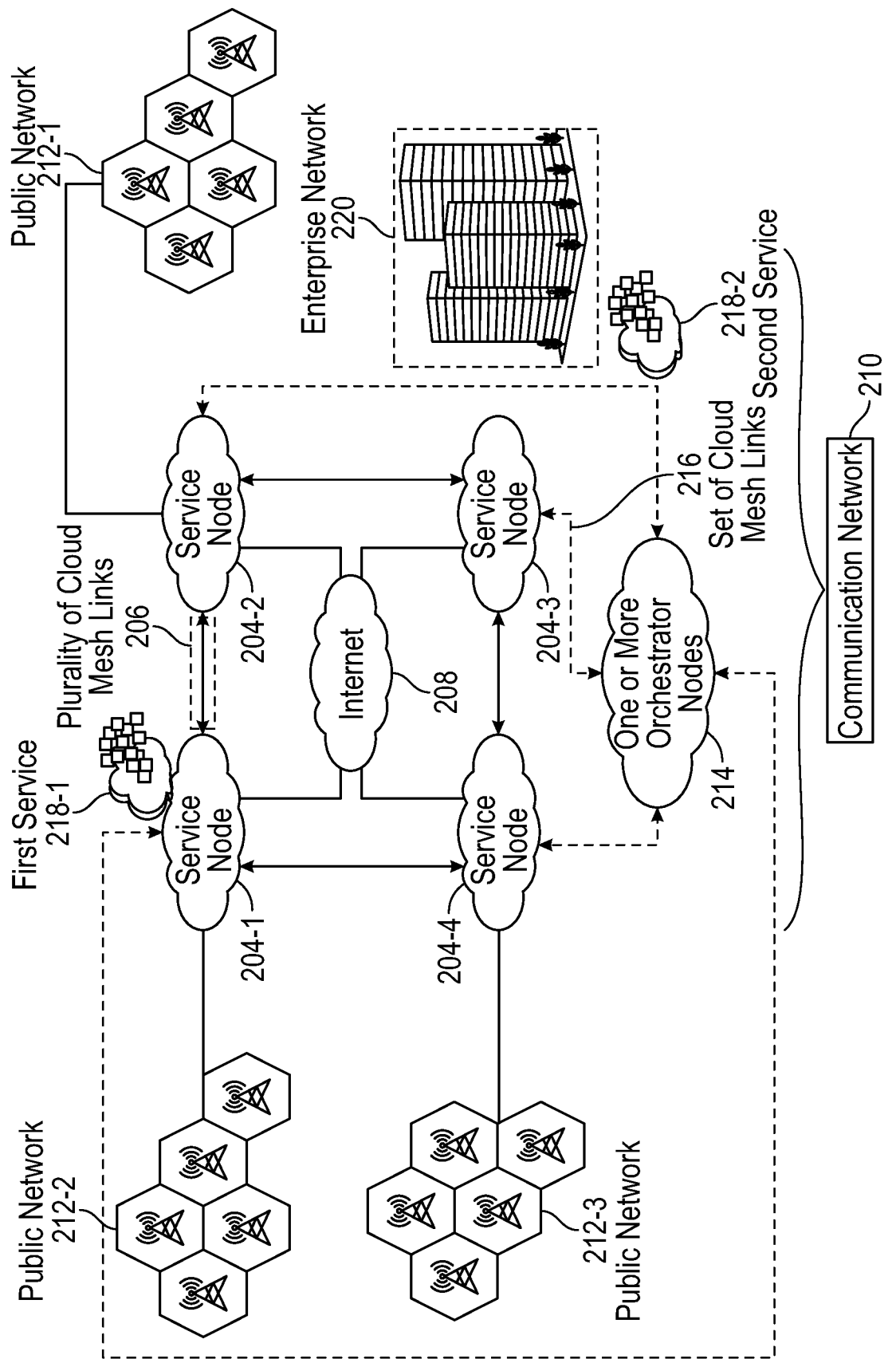
FIG. 2 is a schematic representation of a cloud infrastructure 200 for autonomous data and signaling traffic management in a distributed infrastructure, in accordance with some embodiments of the present disclosure.

FIG. 2 is a schematic representation of a cloud infrastructure 200 for autonomous data and signaling traffic management in a distributed infrastructure, in accordance with some embodiments of the present disclosure. The cloud infrastructure 200 includes the plurality of service nodes 204-1, 204-2, 204-3 and 204-4. For the sake of present description, the plurality of service nodes 204-1, 204-2, 204-3 and 204-4 have been represented as the plurality of service nodes 204. The service node 204-3 is an enterprise cloud associated with the organization. Further, the service node 204-4 is a far edge cloud located at a distant position from the organization. The cloud infrastructure 200 includes the one or more electronic devices 108 associated with the organization connected to the communication network 210 via the communication channel. In some embodiments of the present disclosure, the communication network 210 is a 4G, 5G, 6G and WiFi network with the set of network functions including multiple 4G, 5G, 6G and WiFi network functions running on variety of cloud and compute infrastructures. Furthermore, the cloud infrastructure 200 includes a first public network 212-1, a second public network 212-2 and a third public network 212-3 to communicatively couple the one or more external devices 202 to the plurality of service nodes 204. In some embodiments of the present disclosure, the second public network 212-2 is shorter public network. The plurality of service nodes 204 are connected with each other via the plurality of cloud mesh links 206 and the internet 208. Further, the one or more orchestrator nodes 214 are connected to the plurality of service nodes 204 via a set of cloud mesh links 216. The one or more external devices 202 host a first service 218-1 and a second service 218-2 accessible by the plurality of service nodes 204. In some embodiments of the present disclosure, the plurality of service nodes 204 may also be communicatively coupled with one or more operator networks to achieve seamless integration of the one or more electronic devices 108 with the one or more operator networks.

In some embodiments of the present disclosure, the computing environment 200 is applicable in telecommunication, healthcare, manufacturing, transport, public safety domains and the like. As described above, the computing environment 200 includes the plurality of service nodes 204-1, 204-2, 204-2 and 204-4. For the sake of present description, the plurality of service nodes 204-1, 204-2, 204-3 and 204-4 have been represented as the plurality of service nodes 204. The service node 204-3 is an enterprise cloud associated with the organization. Further, the service node 204-4 is a far edge cloud located at a distant position from the organization. The computing environment 200 includes one or more electronic devices 108 associated with the organization connected to the enterprise network 220 via the private communication channel. In some embodiments of the present disclosure, the enterprise network is a 4G or 5G or 6G or WiFi network and the like. Furthermore, the computing environment includes a first public network 206-1, a second public network 206-2 and a third public network 206-3 to communicatively couple the one or more external devices 202 to the plurality of service nodes 204. In some embodiments of the present disclosure, the second public network 206-2 is shorter public network. The plurality of service nodes 204 are connected with each other via the network 212 and internet 224. Further, the one or more orchestrator nodes 214 are connected to the plurality of service nodes 204 via the network 212. In some embodiments of the present disclosure, the network 212 may be the one or more cloud mesh links. The one or more external devices 202 host a first public network application 226-1 and a second public network application 226-2 accessible by the plurality of service nodes 204.

Figure 3:
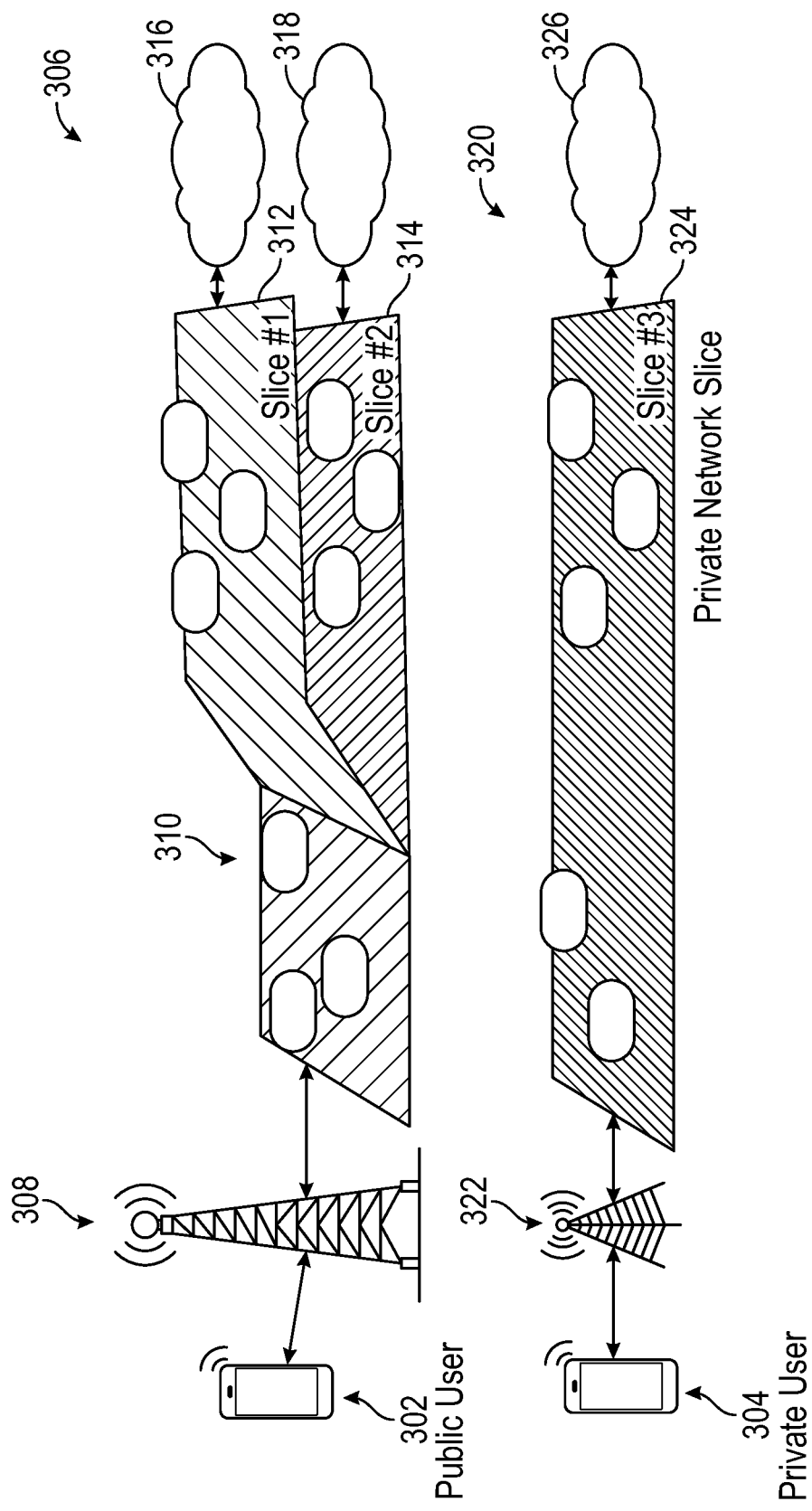
FIG. 3 is a schematic view of public and private network slices, in accordance with some embodiments of the present disclosure.

FIG. 3 is a schematic view of public and private network slices, in accordance with some embodiments of the present disclosure. In FIG. 3, a public user 302 and a private user 304 are shown for illustration purposes and correspond to electronic devices associated with respective networks. A public network 306 is provided for public users, such as the public user 302, registered with the public network 306, and a private network 320 is provided for private users, such as the private user 302, and registered with the private network 320. The public network 320 can be a wireless service provider (e.g., mobile network operator (MNO) such as Verizon, T-Mobile, AT&T, etc.). The public network 306 includes a radio access network (RAN) component 308. The RAN component 308 may be provided as one or more base stations (e.g., base transceiver station (BTS), NodeB (NB), eNB, gNB, etc.) The public network 306 may connect electronic devices (e.g., electronic devices 108) such as public user 302 to other parts of the public network 306 via RAN component 308.

The public network 306 may host a set of network functions as service node (described above) and may be provided as plurality of slices 312, 314 (also called network slices). A slice includes shared network components that provides end-to-end connection enabling multiplexing of virtualized and independent logical networks using logical separation. Here, two slices 312, 314 are shown for illustration purposes and more than two slices may be provided in the public network 306. The public network 306 includes shared slice components 310, which are shared by the slices 312, 314. These shared components may include: any network function including 4G, 5G or Wi-Fi network functions, such as Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Centralized Unit (CU), Access & Mobility Management Function (AMF), Session Management Function (SMF), User Plane Function (UPF), Non-3GPP Interworking Function (N3IWF), Network Data Analytics Function (NWDAF), Network Repository Functions (NRF), Network Slicing Selection Function (NSSF), Network Exposure Function (NEF), Unified Data Management (UDM), Authentication Server Function (AUSF), Point Coordination Function (PCF) and the like. Each slice 312, 314 includes dedicated components such as including 4G, 5G or Wi-Fi network functions, such as Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Centralized Unit (CU), Access & Mobility Management Function (AMF), Session Management Function (SMF), User Plane Function (UPF), Non-3GPP Interworking Function (N3IWF), Network Data Analytics Function (NWDAF), Network Repository Functions (NRF), Network Slicing Selection Function (NSSF), Network Exposure Function (NEF), Unified Data Management (UDM), Authentication Server Function (AUSF), Point Coordination Function (PCF) and the like. Slice 312 connects to a data network 316, and slice 318 connects to a data network 318. Data networks 316, 318 may be for different applications, such as streaming, gaming, etc.

As described above, private networks (enterprise networks) in conventional systems can be typically provided using network slices from the public network. However, this use of the public network resources can lead to security and reliability issues. The techniques described in the present disclosure provide complete, independent, and isolated private networks that can use public network spectrum and resources that co-exist with the public network. Private network slices, resources, data, usage, and user information is contained within the private network domain. As shown in FIG. 3, a private network 320 is provided to service private users such as private user 304. For example, the private network 320 may be for an enterprise such as a car manufacturer that sets up a private network in its manufacturing facilities. The private network 320 includes a radio access network (RAN) component 322 (also referred to as private RAN component). The RAN component 322 may be provided as one or more base stations (e.g., base transceiver station (BTS), NodeB (NB), eNB, gNB, etc.). The RAN component 322 may connect electronic devices (e.g., private user 304) to other parts of the private network 320. The private network 320 includes a slice 324 with dedicated private components to connect to private data network 326, which can host enterprise services and applications.

When the public user 302 remains in the coverage area of the public network 306 and the private user 304 remains in the coverage area of the private network 320, the networks operate as described herein with reference to FIGS. 1 and 2, for example. Next, techniques for when a public user roams into a private network and when a private user roams into a public network are described.

Figure 4:
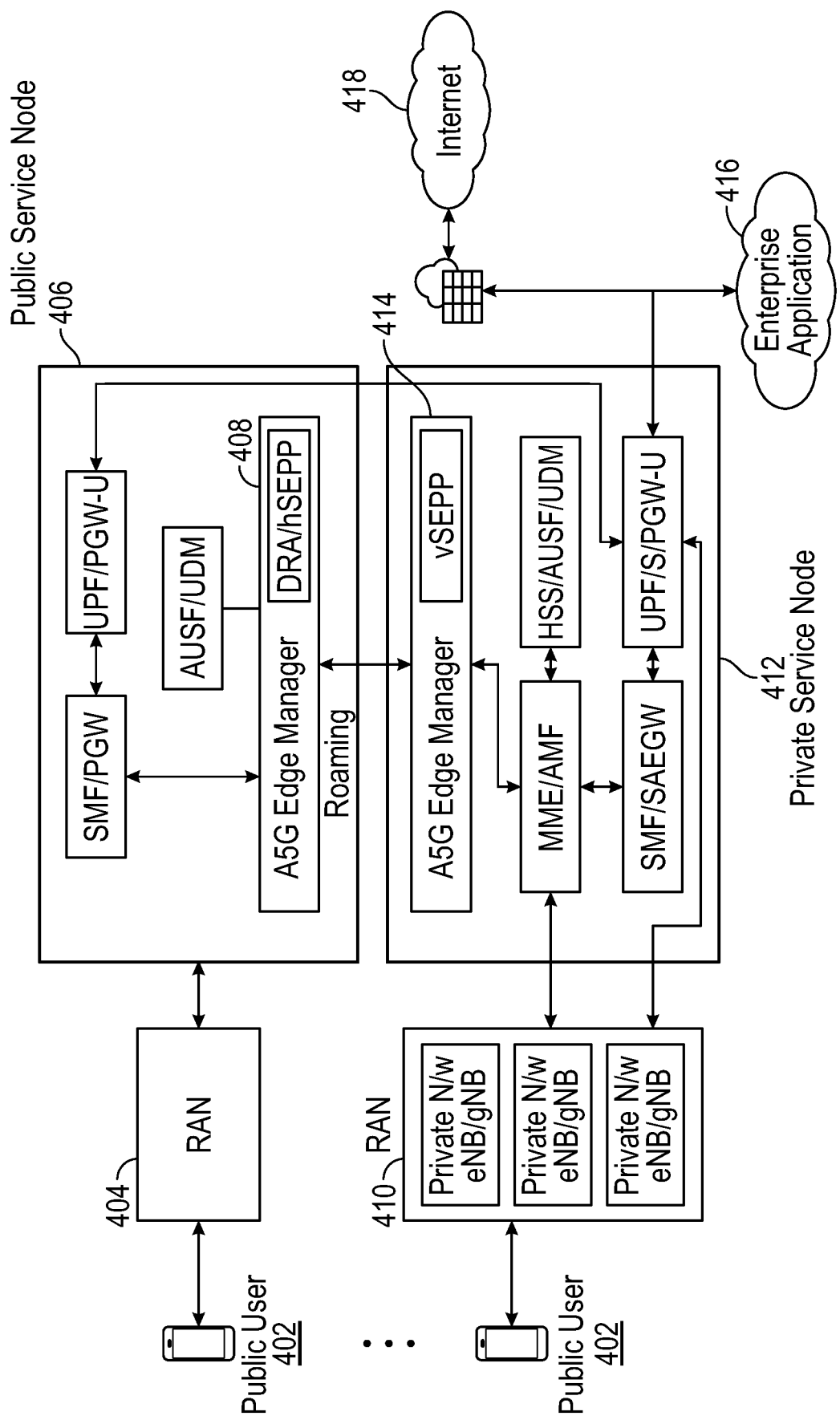
FIG. 4 is a schematic view of network architecture for communication handling when a public user roams into a private network, in accordance with some embodiments of the present disclosure.

As described in further detail below, when a public user roams into a private network, a private network slice from the private network may be created for the public user. FIG. 4 is a schematic view of network architecture for communication handling when a public user roams into a private network, in accordance with some embodiments of the present disclosure. In FIG. 4, a public user 402 is shown for illustration purposes. The public network includes a public RAN component 404 is provided for servicing electronic devices, such as the public user 402, when electronic devices are located inside the coverage area of the public network. The public RAN component may be provided as one or more base stations (e.g., base transceiver station (BTS), NodeB (NB), eNB, gNB, etc.). The public network also includes a public service node 406 hosting network functionality, as described above. In addition to the components described above, the public service node 406 includes an edge manager 408. The edge manager 408 facilitate interactions with other networks, such as private networks and other public networks. Edge manager may take the role of one or more network functions such as S1 proxy, NgAP proxy, Mobility Management Entity (MME), Signaling Gateway (SGW), Packet Gateway (PGW), Access & Mobility Management Function (AMF), Session Management Function (SMF), User Plane Function (UPF), Non-3GPP Interworking Function (N3IWF), Network Repository Functions (NRF), Network Slicing Selection Function (NSSF), Network Exposure Function (NEF) and the like.

As shown in FIG. 4, a private network is also provided. A private RAN component 410 connects electronic devices to a private service node 412 when electronic devices are located inside the coverage area of the private network. The private service node 412 hosts network functionality for the private network as described above. The private service node 412 includes an edge manager 414. The private service node 412 can connect electronic devices to an enterprise application 416 and the internet 418.

When the public user 402 moves outside the coverage area of the public network and into the coverage area of the private network, the public user 402 connects with the private RAN component 410. The private RAN component 410 can include one or more private base stations (e.g., base transceiver station (BTS), NodeB (NB), eNB, gNB, etc.). The private RAN component 410 connects the public user to private service node 412. As most relevant to this public user roaming into the private network scenario, the private service node 412 includes a MME/AMF component, a HSS/AUSF/UDM component, a SMF/SAEGW component, and a UPF/S/PGW-U component.

The MME/AMF component may provide registration functionality. For example, based on the subscriber identity, the MME/AMF may determine that the public user 402 is not a private user of the private network but a public user 402 associated with the public network. The HSS/AUSF/UDM component may manage access authentication and user registration (for private users). The SMF/SAEGW may provide session management functionality. The UPF/S/PGW-U provides data connection functionality by providing connection of the data from the RAN component to the data network.

Here, the MME/AMF component may then route the connection with the public user 402 to the edge manager 414. The edge manager 414 in the private service node 412 may communicate with the edge manager 408 in the public service node 406. For example, the interface with the public user 402 may be routed from the MME/AMF component in the private service node 412 to a HSS/AUSF/UDM component in the public service node 406 with the edge managers 414, 408 acting as respective routing agents (e.g., diameter routing agent for 4G or SEPP for 5G) for authenticating the public user in the public network and servicing the public user.

Figure 5:
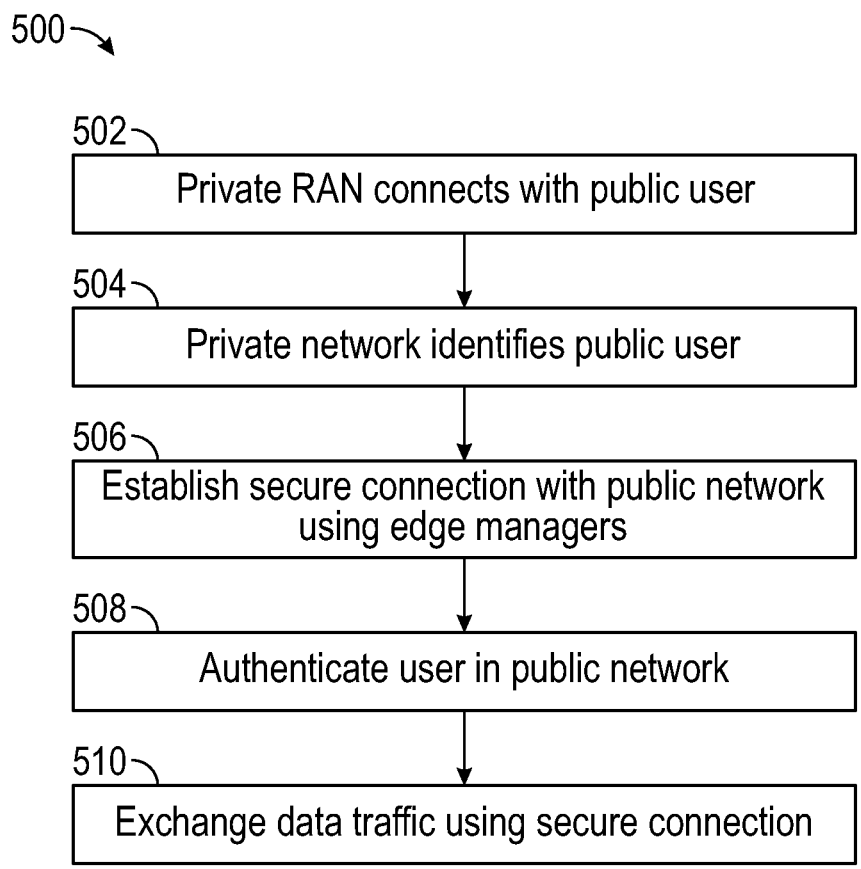
FIG. 5 illustrates a flow diagram for a method for facilitating a public user roaming into a private network, in accordance with some embodiments of the present disclosure.

FIG. 5 illustrates a flow diagram for a method 500 for facilitating a public user roaming into a private network, in accordance with some embodiments of the present disclosure. At operation 502, a private RAN component (e.g., base station) belonging to the private network may connect with the public user. At operation 504, a mobile management function component (e.g., MME/AMF) in the private network may identify the user as a public user, and not a private user belonging to the private network. For example, the identification of the public user can be performed based on the subscriber identity (e.g., SIM) of the public user. Moreover, the identity of the public network to which the public user is registered with may also be identified.

At operation 506, the private network may establish a secure connection with the public network to which the public user belongs. An edge manager in the private network may establish a secure connection with an edge manager in the public network. SMF is allocated by the AMF considering the user slice requirement and data network (DN) attachment requirement. Placement of SMF can be done either on the 606 or 610. SMF will select the most suitable uPF as well as a central 'data-plane' if required for certain cases where the services are available only at central PoP (e.g. voice services). For example, the SMF in the private network may allocate a UPF in the private network to connect to a designated UPF in the public network, which is managed by the SMF in the public network. At operation 508, the public user may be authenticated by the public network. For example, the AUSF in the public network may authenticate the public user. At operation 510, the data traffic from the public user may be exchanged using the secure connection between the UPFs of the private and public network.

In some embodiments, the private network slice resources allocated to the public user may be based on ML algorithms in the analytics function in the edge manager for predicting usage and resource allocation for the slice. The analytics function would analyse the slice load and usage pattern by measuring various parameters like time of day, number of devices attached, traffic patterns, etc., across the various network functions. This would result in identifying the amount of slice resources needed to be able to meet SLA (Service Level Agreement) accurately. This would lead to cost savings, improved service and help in achieving better efficiency in terms of hardware and cost. Better utilization of resources would facilitate new revenue streams for the operator paving the path to more lucrative business models. For example, the private network may serve public users by using resource information derived from ML algorithms and environmental information. Network resources may be shared between private and public networks as a criterion for resource allocation. Moreover, the routing of data from the public users served by the private network may be coordinated by one or more orchestrator nodes, as described above. In some embodiments, an orchestrator node may be provided as a neutral hosted service node as well. Each service node may contain a built-in analytics engine with machine learning capabilities. The analytics engine continuously analyses the parameters of each slice and predicts the usage or congestion that is going to happen at a future time. This information is exchanged via Cloud Mesh link between multiple edge locations. Edge managers will take decisions based on above predictions and then internally adjust the resource provisions for each slice at different edge locations. It may start or stop the slice dynamically at appropriate locations. This will translate to lower resource usage while supporting the required SLAs for the slice. For a network slice, the operator would guarantee a set of KPIs to the consumer. This solution will be able to detect if any given edge location is not able to meet the slice SLAs because of any faults. The slice will be moved to nearby edge location in that case. This solution will also help in more transparent and appropriate billing to the customer based on the actual slice usage. For example, the orchestrator nodes may configure roaming relationships between different networks. The routing of non-enterprise user traffic to public network may use cloud mesh links, as described above. In some embodiments, the private network may calculate and maintain records of public users served by the private network. The records may include: roaming agreement, traditional clearing house information relevant for public, private roaming and roaming agreements between enterprise and mobile operator.

In some embodiments when an enterprise user with enterprise identity (SIM) roams into the public network, the enterprise user can connect to the public network to be able to reach the enterprise applications. Public Network RAN (e.g., RAN 604) may allow connectivity to enterprise users based on: a) unique PLMN (Public Land Mobile Network) of the enterprise subscriber; b) unique Slice ID requested by the enterprise subscriber; and/or c) Dedicated core network Identity. The Public RAN can divert the enterprise subscriber using one of above technique to a neutral hosted service node, as described in further detail below.

One or more mobile communication server provider networks can route to the same or different neutral hosted service node specifically hosted to handle enterprise customers. Thus, enterprise private network need not have any restriction of having agreement with a particular CSP (communication service provider). In some embodiments, the neutral hosted service node can have policies on how to serve the enterprise users. The neutral hosted service node can also have the appropriate secure connectivity to each enterprise network.

Based on individual enterprise policy, neutral hosted service node can decide which functions of the subscriber should be performed on the neutral hosted service node as compared to which other functions should be performed at the network functions hosted inside the enterprise. For example, mobility management can be performed on neutral hosted service node, but authentication may be performed with the enterprise AUSF/UDM. Or in another example, mobility management, authentication and session management can all be performed on neutral hosted service node, but the data path can routed towards the UPF inside the enterprise.

Neutral hosted service node can also help comply with lawful interception requirement depending on specific country regulations. For example, the subscriber data being routed through neutral hosted service node towards the enterprise can be routed to lawful interception servers.

In some embodiments, network connectivity may be disrupted. For example, network connectivity between the private and public networks using edge managers may be disrupted. In this network disruption scenario, the private network can continue to operate even if external network connectivity is disrupted; however, the private network may stop serving public users in response to detecting the disruption to the network connection.

Figure 6:
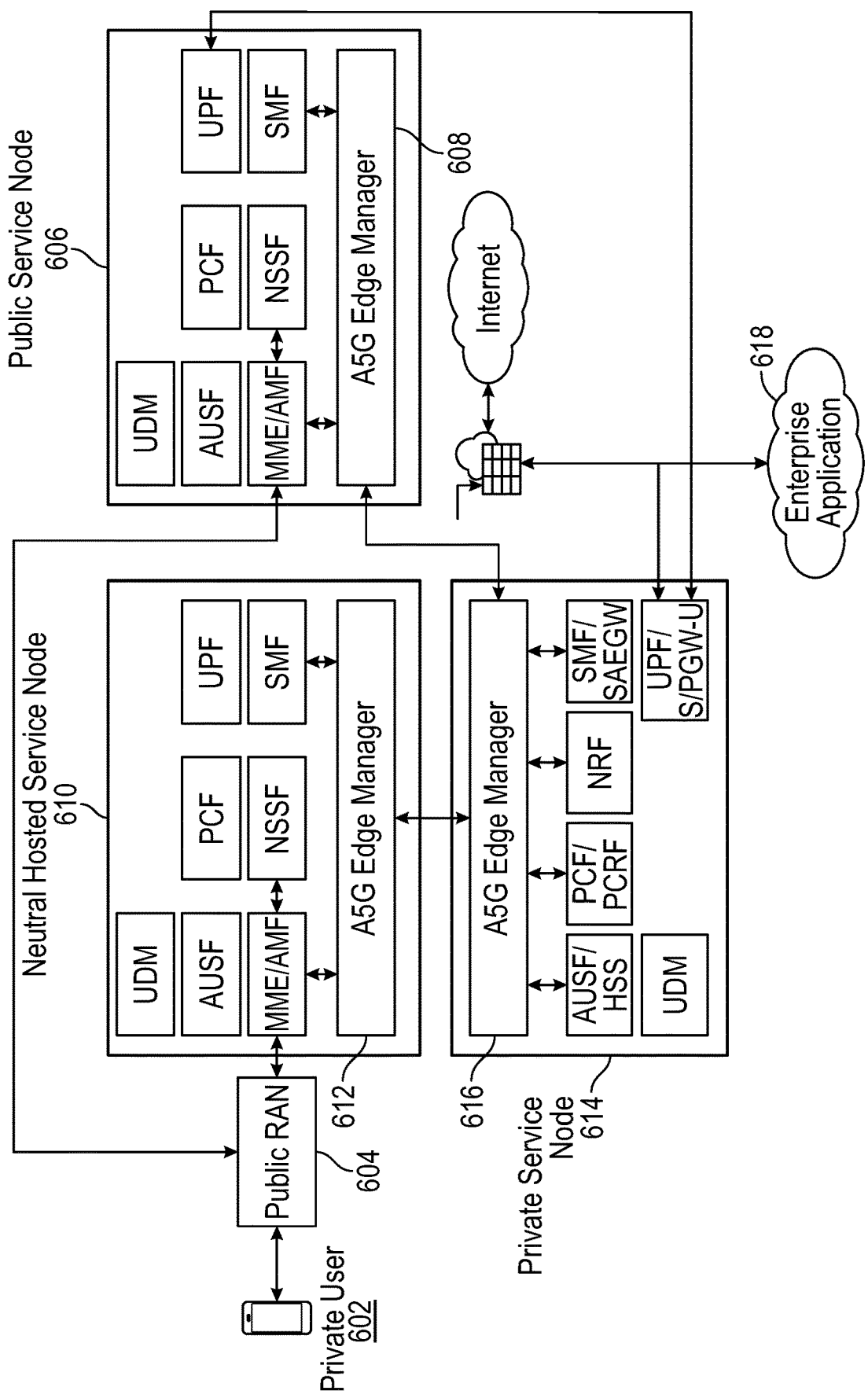
FIG. 6 is a schematic view of network architecture for communication handling when a private user roams into a public network, in accordance with some embodiments of the present disclosure.

As described in further detail below, when a private user (e.g., enterprise user, subscriber, customer, etc.) roams into a public network, a secure connection can be established for the private user to connect with the private network without exposing sensitive information to the public network. A neutral hosted service node (also referred to as a neutral hosted core) can be used to handle the private data sessions when the private user roams out of the coverage area of the private network and into a public network. FIG. 6 is a schematic view of network architecture for communication handling when a private user roams into a public network, in accordance with some embodiments of the present disclosure. As shown in FIG. 6, a private user 602 roams outside the coverage area of its private network (depicted by a private service node 614) and into a public network. A RAN component 604 connects electronic devices, such as public users, to a public service node 606, as described above. The public service node 606 hosts network functionality for the public network as described above. As most relevant to the discussion here, the public service node 606 includes an MME/AMF component, a AUSF component, a UDM component (also sometimes referred in combination as HSS/AUSF/UDM component), a SMF component (also referred to as SMF/SAEGW), a UPF component (also referred to as UPF/S/PGW-U), a PCF (Policy Control Function) component, and a NSSF (Network Slice Selection Function) component.

The MME/AMF component may provide registration functionality. The AUSF and UDM components may manage access authentication and user registration (for private users). The SMF may provide session management functionality. The UPF component provides data connection functionality. The PCF component prices policy control functionality. The NSSF component provides slice selection functionality. The public service node 606 also includes an edge manager 608 to connect with other service nodes such as the private service node 614, for example to handle public users that have roamed into the private network as described above.

The private network includes the private service node 616. The private service node 616 hosts network functionality for the private network for providing access to an enterprise application 618 as described above. As most relevant to the discussion here, the public service node 606 includes an a AUSF/HSS component, a UDM component (also sometimes referred in combination as HSS/AUSF/UDM component), a SMF component (also referred to as SMF/SAEGW), a UPF component (also referred to as UPF/S/PGW-U), a PCF (Policy Control Function) component, and a NRF (Network Repository Function) component.

The AUSF and UDM components may manage access authentication and user registration (for private users). The SMF component may provide session management functionality. The UPF component provides data connection functionality. The PCF component prices policy control functionality. The NRF component provides network repository functionality. The private service node 614 also includes an edge manager 616 to connect with other service nodes.

The RAN component 604 may also be coupled to a neutral hosted service node 610. The neutral hosted service node 610 may be provided on a cloud-based service. The neutral hosted service node 610 includes an edge manager 612 to connect with other service nodes, such as the private service node 614. As described in more detail below, the neutral hosted service 610 may handle subscriber authentication and session processing for the private user 602 when it roams into the coverage of the public network. The RAN component 604 may detect the subscriber identity, such as APN, of the private user 602, and may route the connection with the private user 602 to the neutral hosted service node 610.

The neutral hosted service node 610 hosts network functionality for enabling authentication and session processing for the private user 602. In some embodiments, the neutral hosted service node 610 may include slice resources based on sharing parameters. The sharing parameters may be configured and injected by an orchestrator node described above. As most relevant to the discussion here, the neutral hosted service node 610 includes an MME/AMF component, a AUSF component, a UDM component (also sometimes referred in combination as HSS/AUSF/UDM component), a SMF component (also referred to as SMF/SAEGW), a UPF component (also referred to as UPF/S/PGW-U), a PCF (Policy Control Function) component, and a NSSF (Network Slice Selection Function) component.

The MME/AMF component may provide registration functionality. The AUSF and UDM components may manage access authentication and user registration (for private users). The SMF may provide session management functionality. The UPF component provides data connection functionality. The PCF component prices policy control functionality. The NSSF component provides slice selection functionality.

In some embodiments, the private user 602 may include dual SIMs (Subscriber Identity Module). A first SIM may designate the private network as its preferred network. Hence, when the RAN component 604 identifies an electronic device (private user 602) based on its private APN stored in its first SIM as a private user with the preferred network as the private network, the RAN component 604 may select the neutral hosted service node 610 for subscriber authentication and session processing. A dual SIM device may also be connected with the public service node 606 and be authenticated there using its public APN stored in its second SIM.

Figure 7:
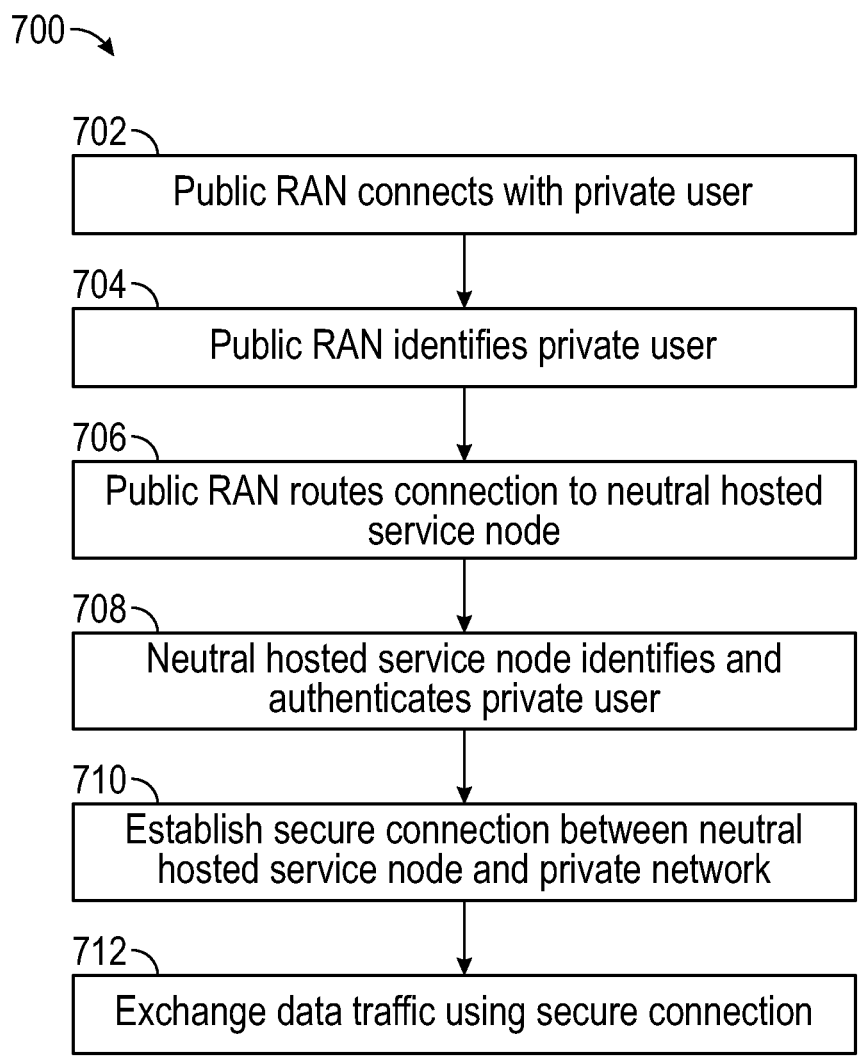
FIG. 7 illustrates a flow diagram for a method 700 for facilitating a private user roaming into a public network, in accordance with some embodiments of the present disclosure.

FIG. 7 illustrates a flow diagram for a method 700 for facilitating a private user roaming into a public network, in accordance with some embodiments of the present disclosure. At operation 702, a RAN component (e.g., base station) belonging to the public network may connect with the private user. At operation 704, the RAN component may identify the preferred network of the private user as the private network. The RAN component may detect the preferred network information from the APN information stored in a SIM of the private user. At operation 706, the RAN component may route the connection of the private user to a neutral hosted service node. At operation 708, a mobile management function component (e.g., MME/AMF) in the neutral hosted service node may identify and authenticate the user as a private user belonging to the private network using either the enterprise HSS/AUSF/UDM/UDR or HSS/AUSF/UDM/UDR in the neutral hosted service node. In some embodiments, the private user may additionally be authenticated by the public network (MME/AMF component) based on APN information stored in a second SIM of the private user.

At operation 710, the neutral hosted service node may establish a secure connection with the private network to which the private user belongs. For example, an edge manager in the private network may establish a secure connection with an edge manager in the public network. For example, the SMF in the neutral hosted service node may allocate a UPF in the neutral hosted service node to connect to a designated UPF in the private network, which is managed by the SMF in the private network. At operation 712, the data traffic from the private user may be exchanged using the secure connection between the UPFs of the neutral hosted service node and the private network, for example with an enterprise application. This technique creates a private network slice for the private user roaming in the public network while maintaining data security of the private user. The use of the neutral hosted service node can keep the data shared by private users local and private while still providing connectivity outside of the coverage of the private network.

The roaming techniques described herein allow users to have a resilient experience with private networks while also offering network extension to public networks. Hence, these roaming techniques allow networks to use resources in a cooperative manner to maximize resource utilization.

Figure 8:
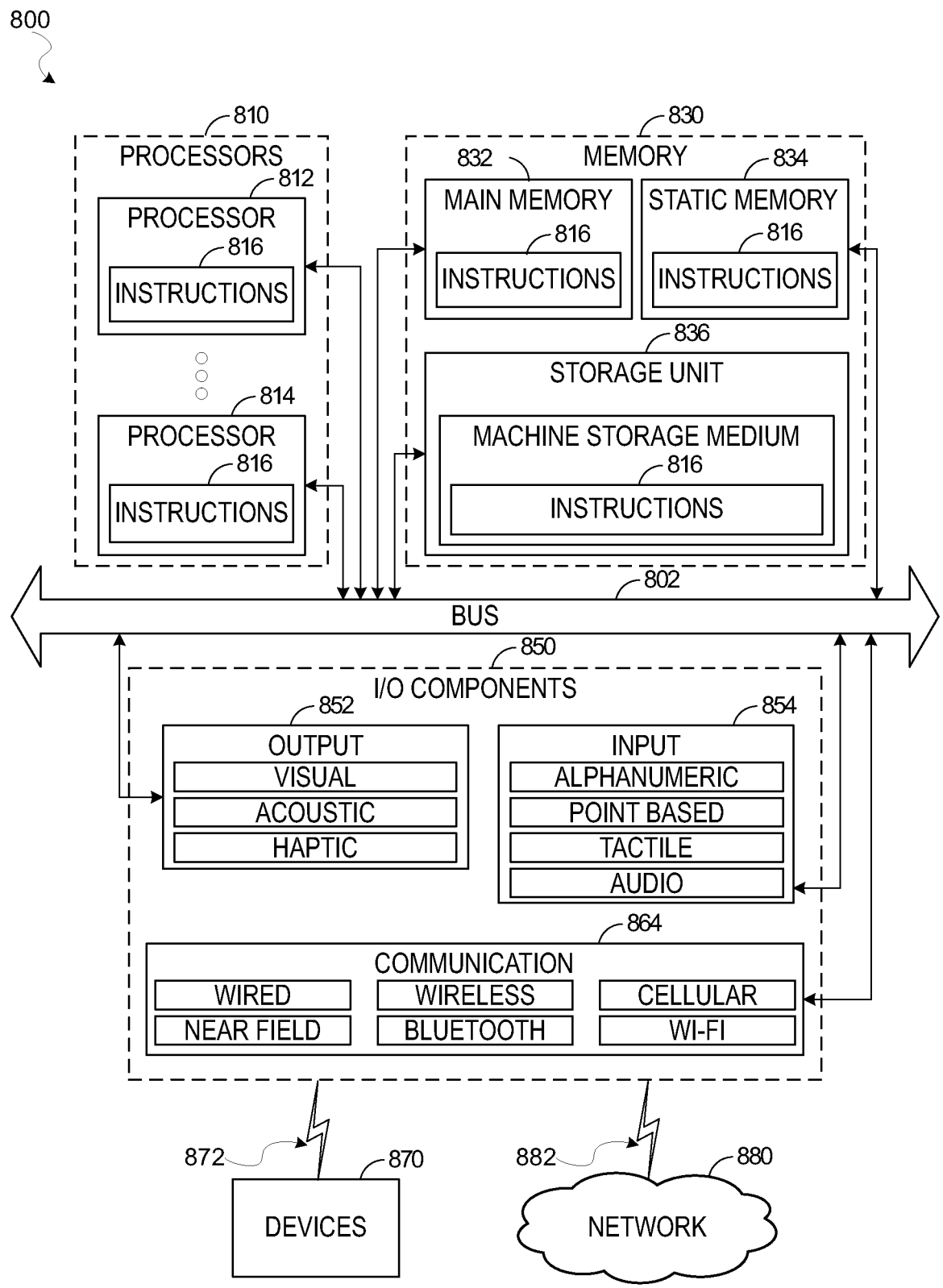
FIG. 8 illustrates a diagrammatic representation of a machine in the form of a computer system within which a set of instructions may be executed for causing the machine to perform any one or more of the methodologies or techniques discussed herein, in accordance with some embodiments of the present disclosure.

FIG. 8 illustrates a representation of a machine 800 in the form of a computer system within which a set of instructions may be executed for causing the machine 800 to perform any one or more of the methodologies and techniques discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods described herein. As another example, the instructions 816 may cause the machine 800 to implement portions of the data flows described herein. In this way, the instructions 816 transform a general, non-programmed machine into a particular machine 800 (e.g., service nodes, orchestrator nodes, edge managers, etc.) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the service nodes, edge managers, orchestrator nodes, etc., described herein, and the devices 870 may include any other of these systems and devices.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network such as those defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method for facilitating roaming into a private network, the method comprising:
    establishing a connection between a radio access network component associated with the private network and a device registered with a public network;
    identifying, by the private network, the device as being associated with the public network;
    allocating, by a first secure management function in the private network, a first user plane function in the private network to connect to a second user plane function among a plurality of edge-deployed user plane functions in different geographic locations in the public network managed by a second secure management function in the public network, wherein the first secure management function executes a first federatively-trained machine learning algorithm that receives predicted usage information and environmental information from one or more edge managers in the public network and outside the private network and selects the second user plane function to satisfy a service level agreement associated with the device;
    establishing a secure connection between a first edge manager in the private network and a second edge manager associated with the second secure management function in public network, the secure connection including dynamically-allocated private network slices that are selected based on the first federatively-trained machine learning algorithm executed by the first secure management function and dynamically-allocated public network slices that are selected based on a second federatively-trained machine learning algorithm executed by the second edge manager;
    authenticating, by the public network, the device as being registered with the public network; and
    exchanging data traffic between the device and the public network using the secure connection after authenticating the device by the public network.

2. The method of claim 1, wherein the identifying is performed by a mobile management function component in the private network based on a subscriber identity associated with the device.

3. The method of claim 1, wherein the allocating the first user plane function is coordinated by an orchestrator node.

4. The method of claim 1, further comprising:
    maintaining records of devices associated with the public network served by the private network.

5. The method of claim 1, further comprising:
    detecting a disruption to network connectivity; and
    stopping data traffic exchange between the device and the public network while maintaining service to private network users.

6. A system comprising:
    at least one hardware processor; and
    at least one memory storing instructions that, when executed by the at least one hardware processor, cause the at least one hardware processor to perform actions comprising:
        establishing a connection between a radio access network component associated with private network and a device registered with a public network;
        identifying, by the private network, the device as being associated with the public network;
        allocating, by a first secure management function in the private network, a first user plane function in the private network to connect to a second user plane function among a plurality of edge-deployed user plane functions in different geographic locations in the public network managed by a second secure management function in the public network, wherein the first secure management function executes a first federatively-trained machine learning algorithm that receives predicted usage information and environmental information from one or more edge managers in the public network and outside the private network and selects the second user plane function to satisfy a service level agreement associated with the device;
        establishing a secure connection between a first edge manager in the private network and a second edge manager associated with the second secure management function in public network, the secure connection including dynamically-allocated private network slices that are selected based on the first federatively-trained machine learning algorithm executed by the first secure management function and dynamically-allocated public network slices that are selected based on a second federatively-trained machine learning algorithm executed by the second edge manager;
        authenticating, by the public network, the device as being registered with the public network; and
        exchanging data traffic between the device and the public network using the secure connection after authenticating the device by the public network.

7. The system of claim 6, wherein the identifying is performed by a mobile management function component in the private network based on a subscriber identity associated with the device.

8. The system of claim 6, wherein the allocating the first user plane function is coordinated by an orchestrator node.

9. The system of claim 6, further comprising:
    maintaining records of devices associated with the public network served by the private network.

10. The system of claim 6, further comprising:
    detecting a disruption to network connectivity; and
    stopping data traffic exchange between the device and the public network while maintaining service to private network users.

11. A machine-storage medium embodying instructions that, when executed by a machine, cause the machine to perform actions comprising:
    establishing a connection between a radio access network component associated with a private network and a device registered with a public network;
    identifying, by the private network, the device as being associated with the public network;
    allocating, by a first secure management function in the private network, a first user plane function in the private network to connect to a second user plane function among a plurality of edge-deployed user plane functions in different geographic locations in the public network managed by a second secure management function in the public network, wherein the first secure management function executes a first federatively-trained machine learning algorithm that receives predicted usage information and environmental information from one or more edge managers in the public network and outside the private network and selects the second user plane function to satisfy a service level agreement associated with the device;

establishing a secure connection between a first edge manager in the private network and a second edge manager associated with the second secure management function in public network, the secure connection including dynamically-allocated private network slices that are selected based on the first federatively-trained machine learning algorithm executed by the first secure management function and dynamically-allocated public network slices that are selected based on a second federatively-trained machine learning algorithm executed by the second edge manager;

authenticating, by the public network, the device as being registered with the public network; and exchanging data traffic between the device and the public network using the secure connection after authenticating the device by the public network.

12. The machine-storage medium of claim 11, wherein the identifying is performed by a mobile management function component in the private network based on a subscriber identity associated with the device.

13. The machine-storage medium of claim 11, wherein the allocating the first user plane function is coordinated by an orchestrator node.

14. The machine-storage medium of claim 11, further comprising:

detecting a disruption to network connectivity; and stopping data traffic exchange between the device and the public network while maintaining service to private network users.

* * * * *